US005863371A

United States Patent [19]

Takemoto et al.

[11] Patent Number: 5,863,371

[45] Date of Patent: Jan. 26, 1999

[54] NOZZLE PLATE AND METHOD FOR SURFACE TREATMENT OF SAME

[75] Inventors: Kiyohiko Takemoto; Shuichi Yamaguchi; Akio Yamamori; Yukiyoshi Icyu, all of Nagano, Japan

[73] Assignee: Seiko Epson Corporation, Tokyo, Japan

[21] Appl. No.: 485,149

[22] Filed: Jun. 7, 1995

Related U.S. Application Data

[62] Division of Ser. No. 201,023, Feb. 24, 1994.

[30] Foreign Application Priority Data

Feb. 25, 1993 [JP] Japan ..................................... 5-60990

[51] Int. Cl.[6] ..................................................... B32B 31/00

[52] U.S. Cl. ......................... 156/273.3; 156/155; 347/45; 427/558

[58] Field of Search ......................... 427/558; 156/273.3, 156/155; 347/45

[56] References Cited

U.S. PATENT DOCUMENTS

| | | |
|---|---|---|
| 4,751,532 | 6/1988 | Fujimura et al. . |
| 4,801,955 | 1/1989 | Miura et al. . |
| 5,387,440 | 2/1995 | Takemoto et al. ........................ 347/45 |

FOREIGN PATENT DOCUMENTS

| | | |
|---|---|---|
| 0 389 217 | 3/1990 | European Pat. Off. . |
| A 0 389 217 A2 | 9/1990 | European Pat. Off. . |
| 0 521 697 | 6/1992 | European Pat. Off. . |
| A 0 508 114 A1 | 10/1992 | European Pat. Off. . |
| 0521697 A2 | 1/1993 | European Pat. Off. . |
| A 0 521 697 A2 | 1/1993 | European Pat. Off. . |
| 0531535 A1 | 3/1993 | European Pat. Off. . |
| 9213720 | 8/1992 | Japan . |

*Primary Examiner*—John J. Gallagher

*Attorney, Agent, or Firm*—Sughrue, Mion, Zinn, Macpeak & Seas, PLLC

[57] ABSTRACT

A photosensitive resin film is pressed onto the surface 1 of nozzle plate 1, with one portion entering the inside of nozzle, then by ultraviolet radiation directed from the rear surface of nozzle plate the intruded portion is hardened as plug, at the same time the portion of photosensitive resin film directly above nozzle being hardened by the ultraviolet radiation to form an extensive portion, of a size at least that of nozzle diameter, being no larger than 1.4 times that of nozzle diameter; finally, using the shape of extensive portion, an ink-repellent eutectoid plating coating layer is applied to the whole surface of nozzle plate with the exception of the edge of nozzle, forming on that surface, a water-repellent surface that does not cause deviation in the flight of ink droplets, while restricting the lining of the inside of nozzle with the coating layer.

6 Claims, 3 Drawing Sheets

NOZZLE PLATE AND METHOD FOR SURFACE TREATMENT OF SAME

This is a divisional of application Ser. No. 08/201,023 filed Feb. 24, 1994.

BACKGROUND OF THE INVENTION

The invention relates to a nozzle plate adapted for an ink-jet type recording apparatus and the surface treatment of the nozzle plate.

RELATED ART

In an ink-jet type recording apparatus which records an image on a recording medium by ejecting ink droplets from a nozzle, there exists a problem in that, when a portion surrounding a nozzle is wetted by an ink, deviation in the direction of the flight of ink droplets occurs.

To address this type of problem, Unexamined Japanese Patent Publications (Kokai) Nos. Sho. 55-65564 and Sho. 57-107848 have proposed an apparatus in which water-repellency treatment is performed on the nozzle plate surface surrounding a nozzle thereby to suppress generation of such wetting by the ink. However it is difficult to restrict the treatment to the nozzle plate surface only. Unexamined Japanese Patent Publication (Kokai) No. Hei. 2-48953 discloses a method whereby a plate impregnated with a silicon water-repellent agent is employed to wipe the surface of a nozzle plate, or pressure is applied to the surface of the nozzle plate by a porous member impregnated with a water-repellent agent.

In this case, with the resulting lining of the inner portion of a nozzle by a portion of the water-repellent agent, when ink drops are ejected at high speed from the nozzle, they contact the water-repellent agent adhered to a portion of the inner surrounding surface of the nozzle and the problem of a marked disruption of the direction of the flight of the ink droplets occurs as before.

SUMMARY OF THE INVENTION

An object of the present invention, in view of the above-mentioned problem, is to provide a new nozzle plate capable of preventing the flight of ink droplets from deviating.

Another object of the invention is to provide a novel nozzle plate surface treatment method of forming a water-repellent coating on the surface of a nozzle plate while restricting the lining of the inside of the nozzle with the water-repellent material.

Namely, the nozzle plate to achieve the above object incorporates a water-repellent coating formed on the nozzle plate surface surrounding the nozzle hole in such a way as to leave a portion not exceeding 20% of the diameter of the nozzle hole uncoated. Further, the nozzle plate surface treatment method for this nozzle plate comprises a photosensitive resin material which can be hardened by exposure to a light source laminated on the nozzle plate surface, with at least one portion entering the inner portion of the nozzle, with the portion of the photosensitive resin directly above the nozzle being exposed to a light source from behind the nozzle plate with sufficient energy to harden a portion of a size at least that of the nozzle diameter, being no more than 40% larger than that of the nozzle diameter. Finally, with this portion of the photosensitive resin hardened, a water-repellent coating layer is formed on the surface of the nozzle plate, incorporating the shape of the hardened portion of photosensitive resin.

DETAILED DESCRIPTION OF THE PREFERRED EMBODIMENTS

Figure 1:
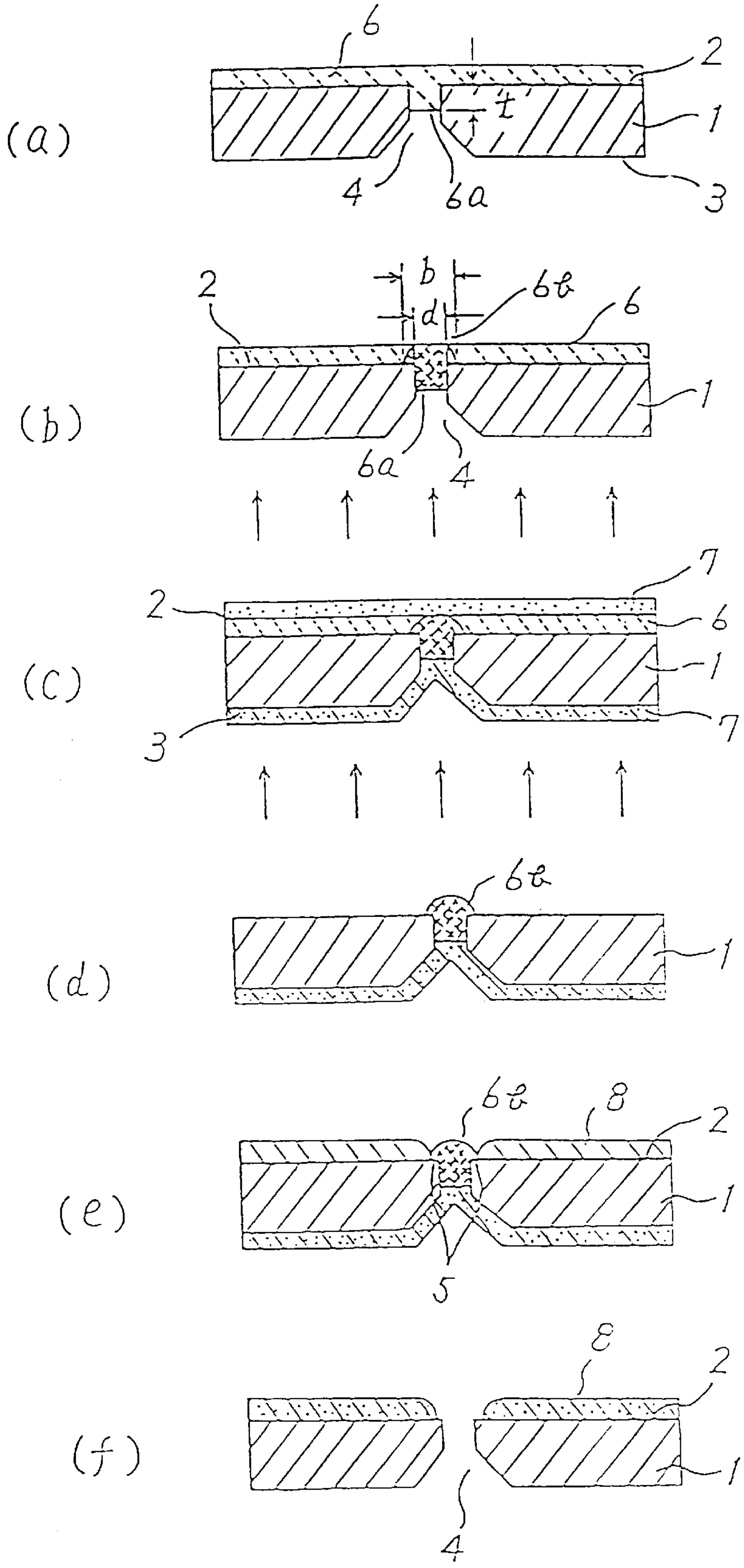
FIG. 1 (*a*) to (*f*) are diagrams showing a process for surface treatment of a nozzle plate, which is an embodiment of the invention.
Figure 2:
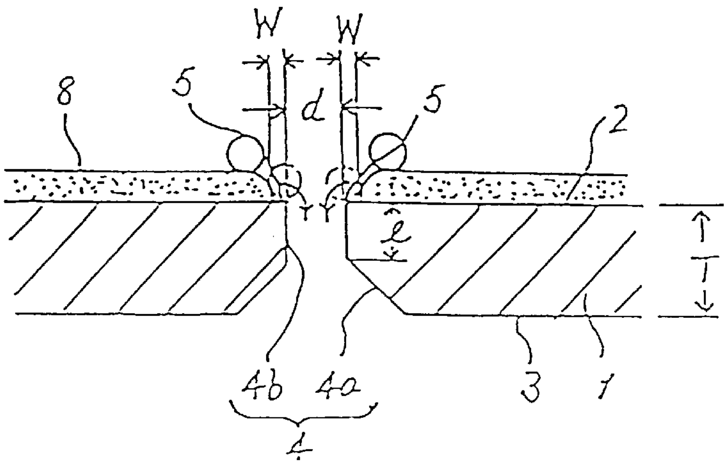
FIG. 2 shows a cross section diagram of an example of a nozzle plate formed according to the above-mentioned process.

FIGS. 1(*a*) to 1(*e*) shows a nozzle plate surface treatment process, which is an embodiment of the invention, and FIG. 2 shows an example of a nozzle plate formed using this process.

In FIGS. 1(*a*) to 1(*f*), a nozzle plate 1 is made of a material such as metal, ceramic, silicon, glass or plastic; and preferably of a single metal such as titanium, chromium, iron, cobalt, nickel, copper, zinc, tin, gold; or of an alloy such as a nickel-phosphor alloy, a tin-copper-phosphor alloy (phosphor bronze), a copper-zinc alloy, or a stainless steel; of polycarbonate, polysulfone, an ABS resin (acrylo-nitrile-butadiene-styrene copolymer), polyethylene terephthalate, polyacetal; and various photosensitive resins.

The nozzle plate 1 has a plurality of nozzle holes 4, each consisting of an inverted funnel-like portion 4*a* on a rear surface 3 and a thinly opened orifice portion 4*b* on a front surface 2.

Firstly, a photosensitive resin film 6, for example Dialon FRA305-38 (product name) dry resist film made by Mitsubishi Layon, is laminated onto the front surface 2 of nozzle plate 1. Next, the photosensitive resin film 6 is heated to a temperature above glass transition temperature (above 72°±1° C.) and pressure is applied so that a portion of the film 6 on the rear surface 3 enters the inner portion of the nozzle 4 in the form of a plug 6*a* of a length of more than 8 $\mu$m (FIG. 1 (*a*)).

Next, the rear surface 3 of the nozzle plate 1 is exposed to ultraviolet radiation, the photosensitive resin plug 6*a* within the inner portion of the nozzle hole 4 is hardened, with the ultraviolet radiation passing through the inner portion of the nozzle hole 4, arriving at the surface and being diffracted, deflected and irregularly reflected in such a way as to harden the photosensitive resin film 6 to form an extensive portion 6*b* of a concentrically circular shape and of a size at least that of the nozzle hole diameter d, being no larger than 1.4 times that of nozzle hole diameter d, and having a preferred diameter of 1.2 times that of d (FIG. 1 (*b*)).

Figure 3:
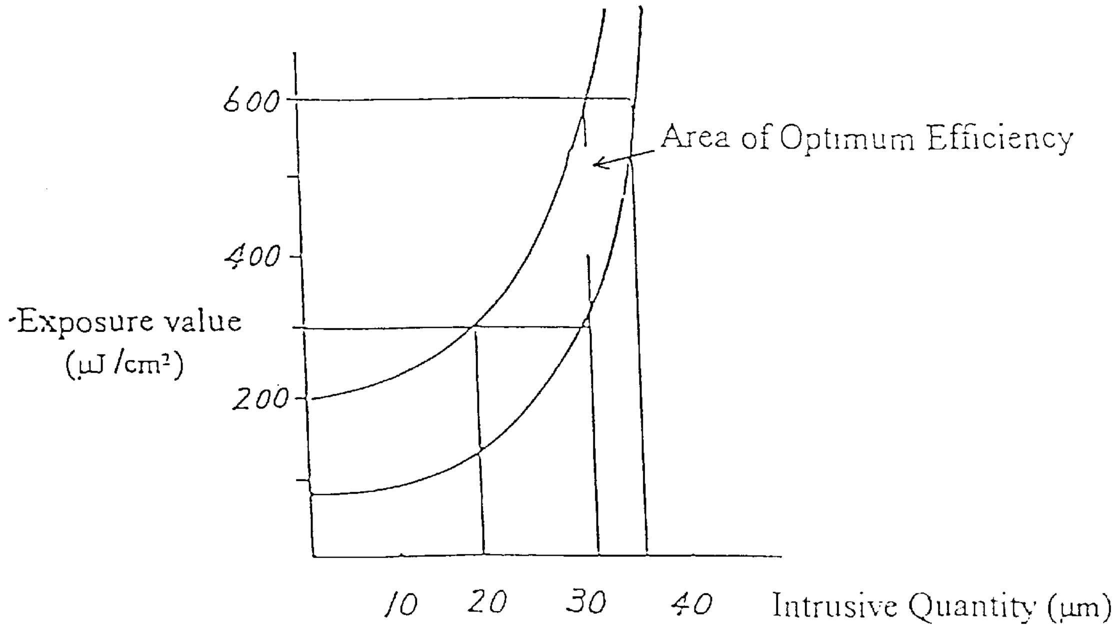
FIG. 3 shows the relationship between the quantity of photosensitive film entering the nozzle of a nozzle plate and the exposure value of ultra-violet radiation.

The diameter of the extensive portion 6*b* being influenced by the quantity of the photosensitive resin film 6 which entered the inner portion of the nozzle 4, together with the extent of the exposure; experiments were conducted using a standard nozzle plate (that is nozzle plate 1, with a plate thickness T of 80 $\mu$m, a nozzle diameter d of 40 $\mu$m, and a funnel-shaped nozzle portion 1 with a length of 35 $\mu$m) varying the amount of ultraviolet radiation (with a wavelength of 365 nm) E (exposure energy)—having a wavelength of 365 nm—applied to the nozzle plate rear surface 3 and the quantity of photosensitive resin film 6 which entered the inner portion of the nozzle 4. FIG. 3 shows the results obtained in these experiments.

The results show that, in the case where the amount of exposure E was substantially smaller with respect to the quantity t of resin film 6 which entered the inner portion of the nozzle 4, the diameter D of the extensive portion 6*b* formed directly above the nozzle 4 was smaller than the nozzle diameter d and furthermore, in the case where the amount of exposure E was substantially larger with respect to the quantity t of resin film 6 which entered the inner portion of the nozzle 4, the diameter D was in excess of 1.4 times diameter d and, as described later, it became impossible to avoid the deflection in the direction of flight of the ink drops. Consequently, the required amount of exposure E with respect to the necessary quantity t of resin film 6 entering the inner portion of the nozzle 4 was determined to be as follows:

In the case where $18 \leqq t \leqq 30$, the exposure value E is 300 mJ/cm2.

In the case where $30 < t \leqq 35$, the exposure value E is 600 mJ/cm2.

Further, the resin plug 6*a,* formed according to this process, being a tight fit within the inner portion of nozzle 4, prevents the extensive portion 6*b* from falling out of nozzle 4 during the coating layer forming process and also prevents the intrusion of the water-repellent macro-molecular resin into the inner portion of nozzle 4. In addition, the projecting extensive portion 6*b* formed on the nozzle plate front surface 2 works as a shape-forming means while eutectoid plating is carried out.

Next, a photosensitive resin material 7, which hardens under exposure to a light source, is applied in liquid form to both the front and rear surfaces 2 & 3 of nozzle plate 1 and under exposure from the rear surface 3, the photosensitive resin 7 on the rear surface 3 hardens in the form of a membrane (FIG. 1 (*c*)).

Next, the remaining unexposed photosensitive resin film 6 on the front surface 2 of nozzle plate 1 and the photosensitive resin material 7 is removed with solvent and acid cleaning is carried out (FIG. 1 (*d*)); then the nozzle plate 1 is immersed in an electrolytic solution in which nickel ions and particles of a water-repellent macro-molecular resin such as polytetrafluoroethylene are dispersed by electrical charges, and coating layer 8 is formed on the front surface 2 of nozzle plate 1 while the solution is agitated (FIG. 1 (*e*)).

Polytetrafluoroethylene, polyperfluoroalkoxybutadiene, polyvinylidene, polyfluorovinyl and polydiperfluoroalkyl fumarate may be used individually or in combination as the fluorine-containing macro-molecule for the eutectoid plating process. There is no particular restriction on the matrix for the coating layer 8; a suitable metal such as nickel, copper, silver, zinc, tin may be selected. Preferred materials include nickel, nickel-cobalt alloy, nickel-phosphor alloy and nickel-boron alloy with good surface hardness. Materials with superior abrasion-resistance properties are preferable.

The polyfluoroethylene particles uniformly cover the entire front surface 2 of nozzle plate 1, except for an area 5 surrounding nozzle 4, which area is covered by the extensive portion 6*b*. This area 5 has a concentrically circular shape with a width W of no more than 0.2 d.

Using a suitable solvent, the plug 6*a,* extensive portion 6*b* and the photosensitive resin material 7, which was hardened to form a protective membrane, are dissolved and removed. Next, avoiding the generation of warpage in the nozzle plate 1 by applying a load to the nozzle plate, a hard ink-repellent coating layer 8 is formed on the front surface 2 of nozzle plate 1 by heating it to a temperature (350° C. or above) higher than that of the melting point of the polytetrafluoroethylene (FIG. 1 (*f*)).

Forming the nozzle plate 1 in this way, as shown in FIG. 2, whilst avoiding any intrusion of material within the inner portion of nozzle 4, an ink-repellent coating layer 8 is formed on the front surface 2 only.

Thus, using a nozzle plate 1 constructed in this way, recording may be carried out and ink droplets ejected at high speed from nozzle 4 will fly correctly in relation to the recording medium. Therefore, in the case where a non-water-repellent surface 5, with a width not exceeding 20% of the nozzle diameter d, is formed on the portion surrounding the nozzle 4, excess ink is either returned to the ink chamber along the inner walls of nozzle 4 or spreads equally around the entire circumference of the non-water-repellent surface 5 forming an area of uniform wetting, these taken together acting to prevent disruption of the flight of the ink droplets. Furthermore, ink remaining on the ink-repellent coating layer 8 adheres to an area where it does not affect the flight of the ink droplets, held in spherical form by surface tension; thus the ink droplets, unaffected by these influences, fly correctly in the direction of the axis of nozzle 4.

This type of nozzle plate 1—with an ink-repellent coating 8 (including a non-ink-repellent surface 5 with varying diameters) being performed on the front surface 2 of nozzle plate 1—has been installed in a 'drop-on-demand' type ink jet printer employing a piezo transducer drive system, and a test has been conducted, whereby 0.1 $\mu$g /dot ink droplets were ejected 100 times at 30 second intervals from a nozzle 4 with a diameter of 40 $\mu$m, with the resultant number of occurences of deviation in the flight of ink droplets being recorded.

| W $\mu$m | Occurences |
|---|---|
| 0.0 | 21 |
| 0.5 | 0 |
| 1 | 0 |
| 4 | 0 |
| 8 | 7 |
| 10 | 68 |

From the above results, we discovered that, in the case where the ink repellent coating layer 8 was extended right to the edge of nozzle 4, a portion of the coating layer 8 entered the inner surface of nozzle 4 and adversely affected the flight of the ink droplets. Further, in the case where a non-water-repellent surface 5, with a diameter W of more than 20% of that of nozzle 4 diameter d, was formed on the portion surrounding nozzle 4, we found a deviation in the flight of ink droplets equal to that which occurred in the case where water-repellent treatment was not performed on the front surface 2 of nozzle plate 1.

Figure 4:
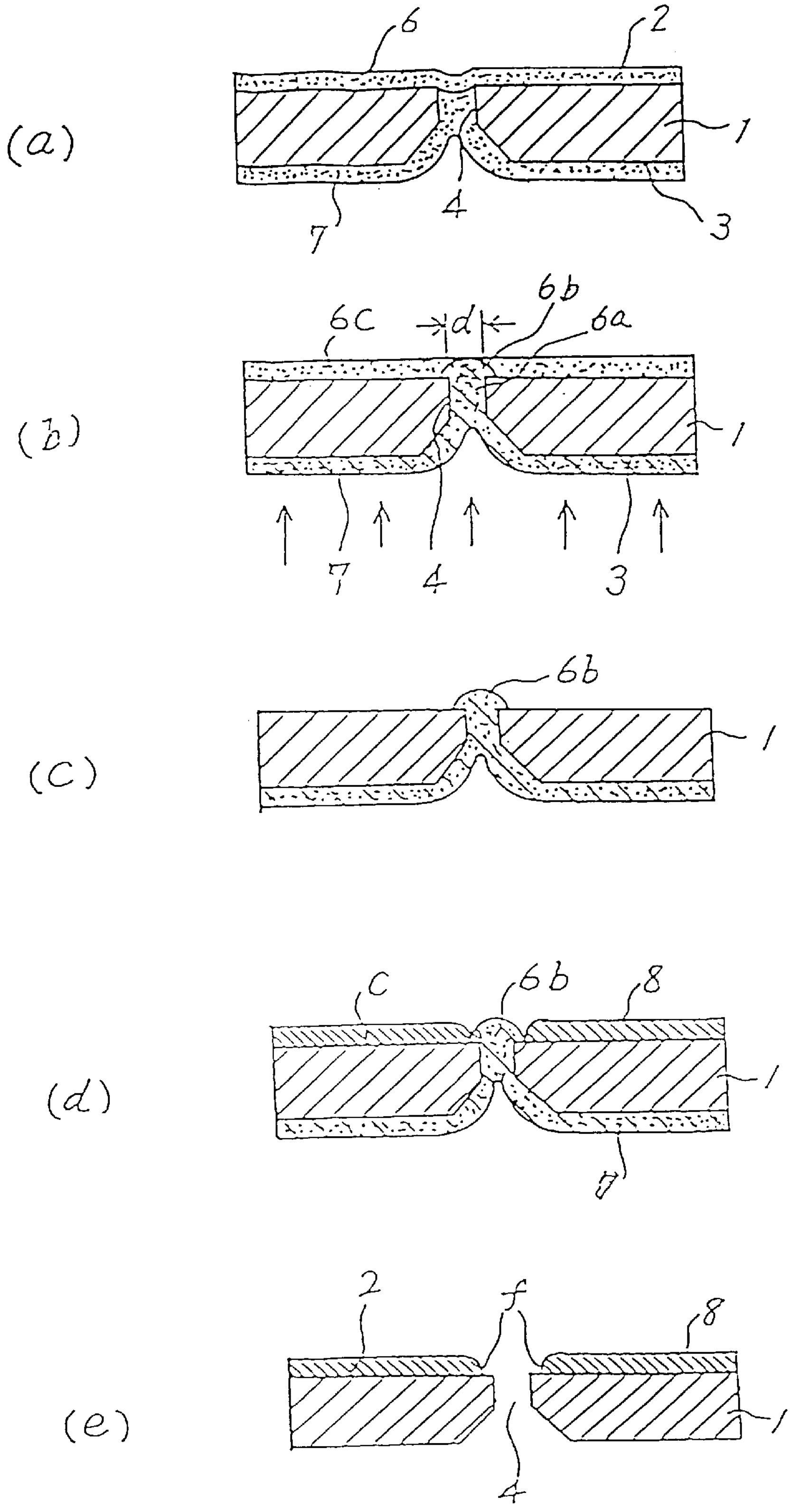
FIG. 4 (*a*) to (*e*) are diagrams showing a production process for a nozzle plate, which is another embodiment of the present invention.

FIG. 4 shows the second embodiment of the method of nozzle plate surface treatment which is the subject of this invention.

In this method, firstly a photosensitive resin film 6, which can be hardened by exposure to a light source, is applied to the front surface 2 of nozzle plate 1 furthermore; a photosensitive resin material 7 which can be hardened by exposure to a light source is applied to the rear surface 3 (FIG. 4 (*a*)).

Next, the entire area of the rear surface 3 of nozzle plate 1 is exposed to ultra-violet radiation, thereby hardening the photosensitive resin material 7 on the rear surface 3 and within the nozzle 4 forming plug 6*a*. Furthermore, the ultra-violet radiation which passes through the nozzle 4 hardens the portion of the photosensitive resin film 6 directly above the nozzle 4 to an extent of at least the diameter of the nozzle d, and not exceeding 1.4 times the diameter d, thus forming extensive portion 6*b* (FIG. 4 (*b*)).

Next, the unexposed portion 6*c* of photosensitive resin film 6 on the nozzle plate front surface 2 is dissolved and removed with a solvent (FIG. 4 (*c*)); then using the extensive portion 6*b* as a means for forming the shape, an ink-repellent coating 8 is formed on the front surface 2 of nozzle plate 1 (FIG. 4 (*d*)).

Lastly, the hardened photosensitive resin material 7 on the rear surface 3 of nozzle plate 1 which protects front surface 2 is removed by dissolving with a solvent and ink-repellent coating layer 8 is thus formed on the whole of the front surface 2 of nozzle plate 1 with the exception of the edge of nozzle 4 (FIG. 4 (*e*)).

In the second embodiment in this application, an ink-repellent coating layer is formed by eutectoid plating on the surface of nozzle plate; however, the formation of the layer by application of a fluorine-containing macro-molecular water-repellent material would be equally satisfactory.

According to the present invention as described above, a water-repellent coating is provided on the nozzle plate surface surrounding the nozzle in such a way as to leave a portion not exceeding 20% of the diameter of the nozzle uncoated, thereby disruption of the flight of ink droplets due to wetting does not occur because wetting by ink around the nozzle is minimized; and disruption of the flight of ink droplets due to the contact of ink droplets with a water-repellent coating within the inner portion of the nozzle can be reliably suppressed. Further, as a nozzle plate surface treatment the front surface of a nozzle plate was coated with a photosensitive resin which entered at least one part of the inner surface of a nozzle, the resin inside the nozzle inner surface being hardened by exposure directed from the rear surface of the nozzle plate and at the same time a portion of the photosensitive resin directly above the nozzle being hardened to a size at least that of the nozzle diameter, being no larger than 1.4 times that of the nozzle diameter by exposure having reached the front surface of the nozzle, the hardened portion directly above the nozzle acting as a means for forming the shape of a water-repellent plating coating on the front surface of the nozzle plate. Further, a hardened resin plug inside the inner surface of the nozzle totally preventing the lining of the nozzle inner surface by the water-repellent coating, the cause of disruption of the flight of ink droplets. In addition, the energy necessary for the exposure was easy to control. Furthermore, detaching of the hardened photosensitive resin portion above the nozzle on the front surface was avoided, that portion thereby acting as a means for forming the shape of a water-repellent layer on the nozzle plate surface and enabling the easy and accurate formation of the water-repellent layer.

What is claimed is:

1. A nozzle plate surface treatment method comprising steps of:

laminating a front surface of a nozzle plate with a photosensitive resin material which may be hardened by exposure to a light source, the photosensitive resin material entering an inner portion of a nozzle of the nozzle plate;

exposing a portion of the photosensitive resin material directly above the nozzle from a rear surface of the nozzle plate to a light sufficient to harden the photosensitive resin material, so as to form a plug (6*a*) in the nozzle and an extensive portion (6*b*) on the front surface, the extensive portion being concentric with the nozzle and having a diameter greater than a diameter of the nozzle, but not larger than 1.4 times the diameter of the nozzle;

removing the photosensitive resin material from the front surface, except for the extensive portion; and forming a water-repellent coating layer on the front surface of the nozzle plate except for an annular area of the front surface around the nozzle, the annular area being covered by the extensive portion.

2. A nozzle plate surface treatment method according to claim 1, wherein the photosensitive resin material is in the form of a photosensitive resin film, the film being subjected to pressure to force a portion of the film to enter the inner portion of the nozzle.

3. A nozzle plate surface treatment method according to claim 1, further comprising steps of, after said exposing step and before said removing step:

applying a photosensitive resin material, in a liquid form, on top of the photosensitive resin material on the front surface of the nozzle plate, and also on the rear surface of the nozzle plate; and exposing the photosensitive resin material on the rear surface of the nozzle plate to a light sufficient to harden the photosensitive resin material on the rear surface, wherein said removing step further comprises removing the photosensitive resin material that was applied in the liquid form on top of the photosensitive resin material on the front surface of the nozzle plate.

4. A nozzle plate surface treatment method according to claim 3, comprising a step of, after said forming step, removing the hardened photosensitive resin material from the rear surface of the nozzle plate, removing the plug (6*a*) and the extensive portion (6*b*), and heating the water-repellent coating layer to form a hard ink-repellent coating layer.

5. A nozzle plate surface treatment method comprising steps of:

laminating a front surface and a rear surface of a nozzle plate with a photosensitive resin material which may be hardened by exposure to a light source, the photosensitive resin material on at least the rear surface entering an inner portion of a nozzle of the nozzle plate;

exposing the photosensitive resin material on the rear surface of the nozzle plate to a light sufficient to harden the photosensitive resin material so as to form a hardened layer of photosensitive resin material on the rear surface of the nozzle plate, a plug (6*a*) inside the nozzle and an extensive portion (6*b*) on the front surface, the extensive portion being concentric with the nozzle and having a diameter greater than a diameter of the nozzle, but not larger than 1.4 times the diameter of the nozzle;

removing the photosensitive resin material from the front surface, except for the extensive portion; and forming a water-repellent coating layer on the front surface of the nozzle plate except for an annular area of the front surface around the nozzle, the annular area being covered by the extensive portion.

6. A nozzle plate surface treatment method according to claim 5, further comprising a step of, after said forming step, removing the hardened layer of photosensitive resin material on the rear surface of the nozzle plate, the plug (6*a*) inside the nozzle and the extensive portion (6*b*) on the front surface.

* * * * *